United States Patent Office 3,060,180
Patented Oct. 23, 1962

3,060,180
ANTHRAQUINONE VAT DYESTUFFS CONTAINING CHLORO-TRIAZINYL GROUPS
Max Staeuble, Basel, and Kurt Weber, Bottmingen, Switzerland, assignors to Ciba Limited, Basel, Switzerland
No Drawing. Filed May 26, 1959, Ser. No. 815,785
Claims priority, application Switzerland May 30, 1958
6 Claims. (Cl. 260—249)

This invention provides valuable new anthraquinone vat dyestuffs which contain at least one aroylamino group and at least one group of the formula

1)

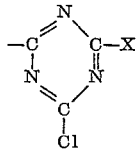

which is bound directly or through a bridge member to an aroyl residue, and in which X represents a hydrogen atom or a substituent. Advantageously, the new compounds correspond to the formula (2)

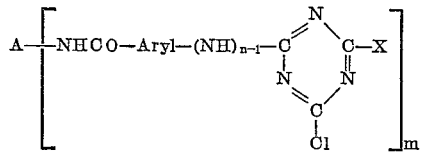

in which A represents an anthraquinone radical, m and n each represent the whole number 1 or 2, and X has the meaning given above.

The invention also provides a process for the manufacture of the above new dyestuffs, wherein an aminoanthraquinone is reacted with a reactive derivative, more especially a chloride, of an aryl carboxylic acid which contains at least one group of the Formula 1 bound directly or through a bridge member to an aroyl radical, and, when the resulting reaction product contains a dichlorotriazine radical, if desired, exchanging one chlorine atom for a substituent containing at least two atoms.

As aminoanthraquinones suitable for the process of this invention there may be mentioned monoamino- and also diaminoanthraquinones, for example, 1-aminoanthraquinone and simple substitution products thereof, such, for example, as 1-amino-4-methoxy-anthraquinone, 1-amino-4- or -5- or -8-acylamino- and especially -benzoyl-amino-anthraquinones. The latter may be substituted in the benzoyl radical, for example, by a halogen atom, methoxy, alkyl, trifluoromethyl, sulfonamido or alkylsulfone group. There may also be mentioned 1:5- and 1:8-diaminoanthraquinone and 1:5-diamino-4:8-dioxy-anthraquinone. There may also be mentioned those aminoanthraquinones which contain a further fused-on carbocyclic or heterocyclic ring, for example, 4-amino-anthraquinone-2:1-(N)-acridone, 5-amino-1:9-isothiazoleanthrone, 4- or 5-aminoanthrapyrimidine, mono-amino- or diamino-acedianthrones, 4- or 5-amino-1:1'-dianthrimide-carbazole, 4:4'- or 5:5'-diamino-1:1'-dianthrimide-carbazole, 4- or 5-amino-5'-benzoylamino-dianthrimide-carbazole or 4-amino-4'-benzoylamino-dianthrimide-carbazone, 4-amino-anthrapyridones, amino-dibenzanthrone, amino - isodibenzanthrone, aminodibenzpyrenequinone, aminoanthrathrone, aminobenzanthrone, aminoflavan-throne, and also the compound of the formula

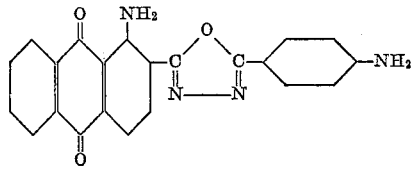

As aryl-carboxylic acids there are advantageously used those of the formula (3)

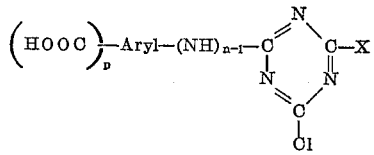

in which aryl advantageously represents a benzene radical, $n$ and $p$ each represent the whole number 1 or 2, and X represents a hydrogen atom or a substituent. As suitable substituents there may be mentioned chlorine atoms, alkyl, phenyl, hydroxyl, alkoxy, hydroxyalkoxy, aryloxy, especially phenoxy, primary and secondary amino groups, for example, an —$NH_2$ group, a mono- or di-alkylamino group, for example, mono- or di-methylamino group, mono-or di-ethylamino group, a monobutyrylamino group, ethylene-imino group, mono- or di-$\beta$-hydroxyethyl-amino group, monochloroethylamino or monocyanethyl-amino group, mono- or di-carboxymethylamino group, or arylamino group, for example, an anthraquinonylamino group, and especially a phenylamino group, which may be substituted in the phenyl radical, advantageously by a hydrophilic group, for example, a carboxylic acid, sulfonic acid, sulfonamido, alkyl-sulfone or alkoxy group, and also groups capable of being converted into hydrophilic groups, for example, sulfofluoride, sulfochloride, carboxylic acid chloride, sulfonic acid ester or carboxylic acid ester groups. The symbol X may be an alkylmercapto or arylmercapto group, for example, a methylmercapto, carboxymethylmercapto, ethylmercapto or phenyl-mercapto group.

As examples of suitable aryl carboxylic acids of the Formula 3 there may be mentioned: 2-carboxyphenyl-amino-4:6 - dichlorotriazines, 2 - carboxyphenylamino-4-amino-6-chlorotriazines, 2-carboxyphenylamino-4-dimethylamino-6-chlorotriazines, 2-carboxyphenylamino-4-ethylene-imino - 6 - chlorotriazines, 2:4 - di - (carboxyphenyl - amino)-6-chlorotriazines, 2 - carboxyphenyl-4:6-dichlorotriazines, 2:4-di-(carboxyphenyl)-6-chlorotriazines and 2 - (3':5' - dicarboxyphenylamino)-4-amino-6-chlorotriazine.

The reaction of the aminoanthraquinones with the reactive derivatives, especially chlorides, of arylcarboxylic acids is advantageously carried out in an inert organic solvent, for example, nitrobenzene, chlorobenzene or ortho-dichlorobenzene, at a raised temperature. Aryl-monocarboxylic acids of the Formula 3 are advantageously reacted in the molecular ratio 1:1 with the mono-aminoanthraquinones or in the molecular ratio 2:1 with the diaminoanthraquinones. Aryldicarboxylic acids of the Formula 3 are advantageously reacted with mono-aminoantharquinones in the ratio 1:2.

When there are used as starting materials those aryl-carboxylic acids of the Formula 3, in which X represents a chlorine atom, that is to say compounds which contain a dichlorotriazine radical, a chlorine atom in the arylide so obtained may be exchanged for a substituent containing at least two atoms, for example, a hydroxyl, alkoxy, hydroxyalkoxy or aryloxy group or one of the primary or secondary amino groups or mercapto groups mentioned above.

The invention also includes a modification of the process described above, wherein an anthraquinone of the formula (4)     A—NH—COAryl—$NH_2$ is condensed with a compound of the formula (5)

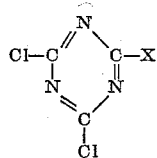

in which X has the meaning given above, and, when the reaction product so obtained contains two chlorine atoms in the triazine radical, one chlorine atom is exchanged for a substituent containing at least two atoms. Thus, for example, one molecular proportion of the compound of the Formula 4 may be reacted with one molecular proportion of cyanuric chloride, and the resulting dichlorotriazine reacted, if desired, with a primary or secondary amine, or two molecular proportions of a compound of

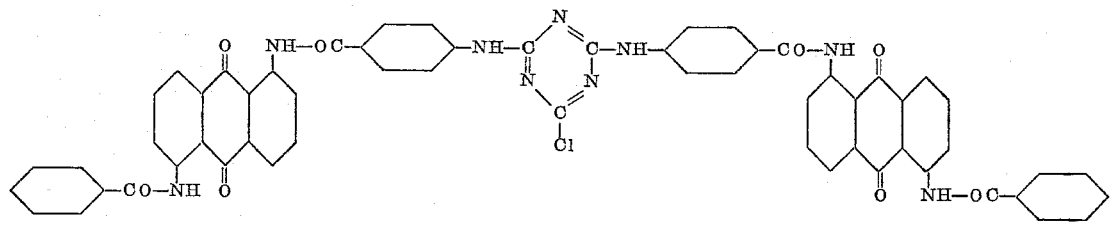

the Formula 4 may be reacted with one molecular proportion of cyanuric chloride.

The dyestuff so obtained may be isolated from the medium in which they are produced and, notwithstanding the presence of an exchangeable halogen atom, they can be converted into useful dry dyestuff preparations. The dyestuff is advantageously isolated by filtration. The filtered dyestuff may be dried, if desired, after the addition of a neutral or weakly alkaline extender. Advantageously the drying is carried out at not too high a temperature, if desired, under reduced pressure.

The new dyestuffs are suitable for dyeing a very wide variety of materials, and especially for dyeing or printing textile materials of natural or regenerated cellulose by the usual vat dyeing or printing methods.

As the reactivity of the halogen atom in the triazine ring varies somewhat from compound to compound it is of advantage to adapt the method of dyeing, that is to say especially the concentration of the alkali or reducing agent, and the duration and temperature of the dyeing or steaming operation, to suit the dyestuff used. The most favourable conditions can easily be determined by preliminary tests.

In contradistinction to the conventional vat dyestuffs, the dyestuffs of this invention are substantially irremovable from the fiber with hot dimethyl formamide so that it is probable that they are chemically bound on the fiber.

Dyeings produced with the dyestuffs of this invention are fast to dry cleaning and migration. The dyed fabrics can therefore be coated with synthetic resins, for example, polyvinyl chloride, without the dyestuff migrating into the artificial resin. This is especially important in the manufacture of artificial leather.

The following examples illustrate the invention, the parts and percentages being by weight.

*Example 1*

3.9 parts of the triazine derivative of the formula

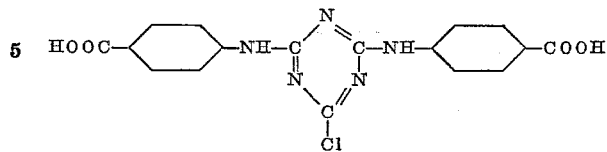

are suspended in 100 parts of dry nitrobenzene and converted into the corresponding dicarboxylic acid chloride with 4 parts of thionyl chloride by being stirred at 100 to 105° C. The excess thionyl chloride is removed from the clear solution in vacuo, and 6.9 parts of 1-amino-5-benzoylamino-anthraquinone are then added. The temperature is raised to 160 to 170° C. and the whole is stirred on for 3 hours at the same temperature. After cooling, the orange-colored suspension of the new dyestuff of the formula is filtered off, washed with nitrobenzene and then with alcohol and dried in vacuo at 60 to 70° C.

A dyestuff powder is thus obtained which is yellowish brown when dry; it dyes cotton and regenerated cellulose by the dyeing method described in Example 19 orange-yellow tints of very good fastness properties. The dyestuff is so securely fixed on the fiber that the strength of the dyeing is not substantially impaired even by a treatment with a hot organic solvent, such as dimethyl formamide or pyridine.

The 2:4-di-(carboxyphenylamino)-6-chlorotriazine used as acylating component in this example can be prepared, for example, by condensing equimolecular proportions of the sodium salt of 4-aminobenzoic acid and cyanuric chloride in the molecular ratio of 2:1 in an aqueous medium at a temperature ranging from 0 to 40° C., by continuing the condensation at a slowly rising temperature until aminobenzoic acid can no longer be detected. To isolate the dicarboxylic acid derivative it is advantageous to adjust the pH value of the aqueous suspension with dilute hydrochloric acid to 2, filtering off the precipitate thus formed, washing it with water until free from acid and drying it in vacuo at 70° C.

*Example 2*

15.4 parts of 2:4-bis-(4'-carboxyphenylamino)-6-chloro-1:3:5-triazine are heated in 300 parts of nitrobenzene with 24 parts of thionyl chloride and 3 parts of dimethyl formamide with stirring for 1 hour at 120° C. The excess thionyl chloride is distilled off in vacuo, at 100° C. 20 parts of 1-aminoanthraquinone are added, and the mixture is heated for 3 hours at 120° C. The dyestuff of the formula

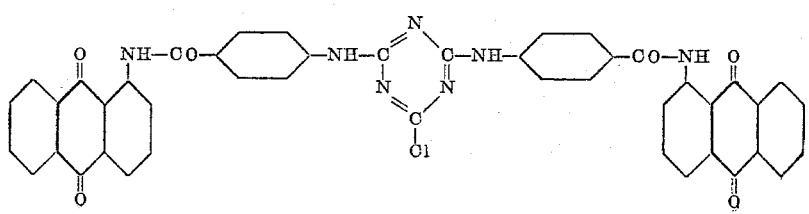

is isolated in the usual manner; it dyes cotton and regenerated cellulose by the method described in Example 20 yellow tints having good fastness properties.

The corresponding dyestuff from 1-amino-4-benzoyl-aminoanthraquinone gives red dyeings of similar, good properties.

When in the above example the 1-aminoanthraquinone is replaced by an equimolecular amount of 1-amino-6:7-dichloroanthraquinone, an orange-yellow dyestuff of very good fastness properties is obtained.

Example 3

3.9 parts of the triazine derivative of the formula

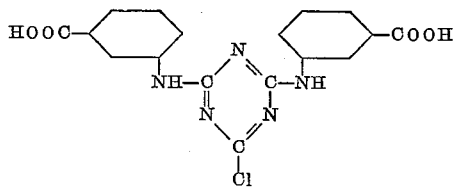

Example 4

3.9 parts of the triazine derivative of the formula

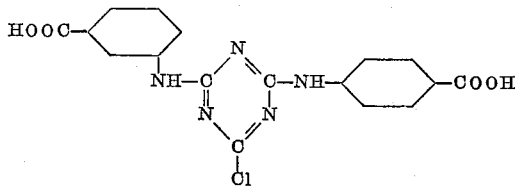

are suspended in 100 parts of trichlorobenzene and converted into the corresponding dicarboxylic acid chloride by being stirred at 100 to 105° C. with 4 parts of thionyl chloride. 6.9 parts of 1-amino-5-benzoylamino-anthraquinone and 0.1 part of dimethyl formamide are added, the temperature is raised to 160–170° C. and the whole is stirred on at this temperature for 3 hours.

After cooling, the dyestuff of the formula

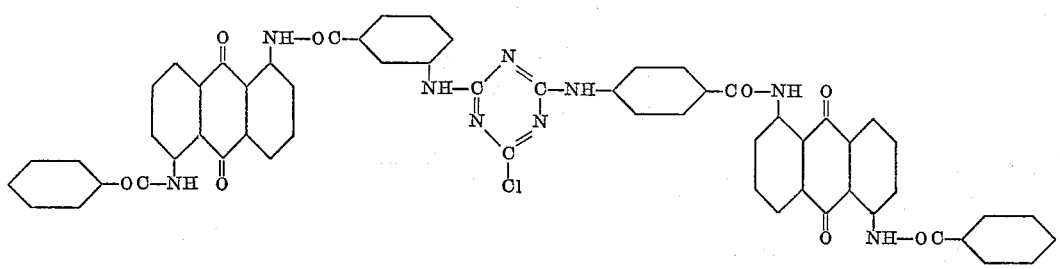

are suspended in 70 parts of dry nitrobenzene and converted into the corresponding dicarboxylic acid chloride by being stirred at 110° C. with 4 parts of thionyl chloride. The excess thionyl chloride is removed from the solution in vacuo, and 6.9 parts of 1-amino-5-benzoyl-aminoanthraquinone are then added. The temperature is raised to 160° C., 0.1 part of pyridine is added, and the mixture is stirred on for 1 hour at 160° C. After cooling, the new dyestuff of the formula is filtered off, washed with trichlorobenzene and then with alcohol, and dried in vacuo at 70–80° C.

The dyestuff dyes cotton and regenerated cellulose by the method described in Example 19 yellow tints having very good fastness properties.

The acylating component used in this example can be made, for example, in the following manner:

Equimolecular amounts of the sodium salt of 3-aminobenzoic acid and cyanuric chloride are condensed in the

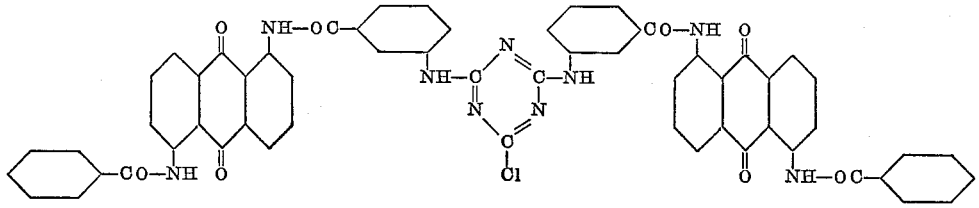

is filtered off, washed with nitrobenzene and then with alcohol and dried in vacuo at 80° C.

Cotton and regenerated cellulose are dyed by the method described in Example 19 yellow tints having very good fastness properties.

The acylating component used in this example can be prepared, for example, by condensing equimolecular amounts of the sodium salt of 3-aminobenzoic acid and cyanuric chloride in the molecular ratio of 2:1 in an aqueous medium at a temperature ranging from 0 to 45° C., by continuing the condensation at a slowly rising temperature until aminobenzoic acid can no longer be detected. To isolate the dicarboxylic acid derivative the pH value of the solution is advantageously adjusted to 2 with dilute hydrochloric acid, and the precipitate formed is filtered off, washed until free from acid and dried in vacuo at 60 to 70° C.

molecular ratio of 1:1 in an aqueous medium at 0–5° C. On completion of the monocondensation, 1 molecular proportion of 4-aminobenzoic acid is added in the form of a neutral aqueous solution of the sodium salt and condensation is performed at a temperature rising to 40° C. until aminobenzoic acid can no longer be detected. To isolate the asymmetrical dicarboxylic acid derivative the reaction mixture is acidified, and the product is filtered off, washed with water and dried in vacuo at 70° C.

Example 5

3.4 parts of 2-(4'-carboxyphenylamino)-4-amino-6-chloro-1:3:5-triazine are suspended in 50 parts of dry nitrobenzene and 1.0 part of dimethyl formamide, and 3.0 parts of thionyl chloride are stirred in. The mixture is heated at 90–100° C. until a clear solution of the acid chloride is obtained. 3.4 parts of 1-amino-5-benzoylamino-anthraquinone are then added. The temperature is raised to 125 to 130° C., and the whole is stirred for a further 6 hours at this temperature, cooled to room temperature and the dyestuff of the formula

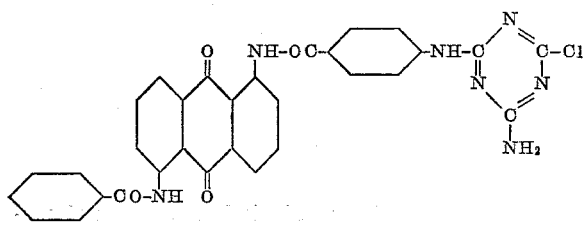

is filtered off, washed with methanol, and dried at 70° C.

The dyestuff produces on cotton and regenerated cellulose by the method described in Example 21 very fast orange-yellow prints.

The 2-(4'-carboxyphenylamino)-4-amino-6-chloro-1:3:5-triazine used in this example can be prepared by condensation in an aqueous medium of a fine suspension of 2-amino-4:6-dichloro-1:3:5-triazine and the sodium salt of 4-aminobenzoic acid in the molecular ratio of 1:1 at 30–40° C., or by first condensing cyanuric chloride and the sodium salt of 4-aminobenzoic acid in an aqueous medium at 0–4° C. to form 2-(4'-carboxyphenylamino)-4:6-dichloro-1:3:5-triazine and reacting a further chlorine atom at 30–40° C. with a slight excess of ammonia.

Equally good results are obtained by using as the acylating component 2-(4'-carboxylphenylamino)-4-dimethylamino-6-chloro-1:3:5-triazine of the formula

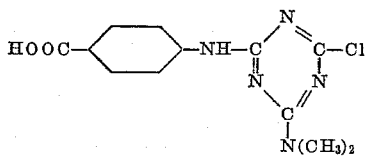

or 2-(4'-carboxyphenylamino)-4-diethylamino-6-chloro-1:3:5-triazine of the formula

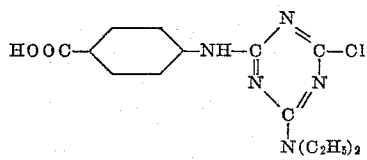

These acylating components can be prepared in a manner similar to that described in this example for the preparation of 2-(4'-carboxyphenylamino)-4-amino-6-chloro-1:3:5-triazine, by condensing the sodium salt of 4-aminobenzoic acid in an aqueous medium with 2-dimethylamino-4:6-dichlorotriazine or with 2-diethylamino-4:6-dichlorotriazine respectively.

Similar dyestuffs which dye cotton and regenerated cellulose the tints shown in column III of the following table are obtained when in the above example 1-amino-5-benzoylaminoanthraquinone is replaced by an equimolecular amount of the starting materials listed in column II of the following table:

| I | II | III |
|---|----|-----|
| 1 | ![anthraquinone with Cl and NH₂] | orange-yellow. |
| 2 | ![fused heterocyclic anthraquinone with H₂N] | yellow. |
| 3 | ![anthraquinone-NH-OC-phenyl-NH₂] | yellow. |
| 4 | ![anthraquinone with NH₂ and oxadiazole-phenyl-NH₂] | red. |

Example 6

3.2 parts of 2-(4'-carboxyphenylamino)-4-amino-6-chloro-1:3:5-triazine are converted into the corresponding carboxylic acid chloride in 100 parts of nitrobenzene with 2.5 parts of thionyl chloride at 95–100° C. The solution is treated with 0.2 part of pyridine and then with 1.4 parts of 1:5-diamino-4:8-dihydroxyanthraquinone, and the temperature is maintained at 120–125° C. for 2 hours with stirring. The mixture is then heated for 1 hour at 150–155° C., cooled to room temperature, and the dyestuff of the formula

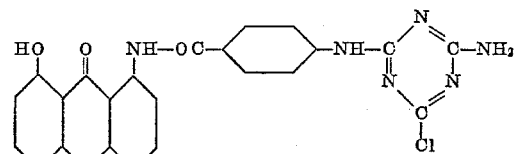
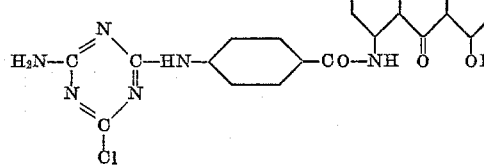

is filtered off and dried.

The dyestuff dyes cotton and regenerated cellulose blue-violet tints having very good fastness to solvents.

Example 7

6.4 parts of 2-(4'-carboxyphenylamino)-4-amino-6-chloro-1:3:5-triazine are converted into the corresponding carboxylic acid chloride in 100 parts of nitrobenzene with 5 parts of thionyl chloride in the presence of 0.5 part of pyridine at 90 to 100° C. The excess thionyl chloride is expelled in vacuo and 2.4 parts of 1:5-diaminoanthraquinone are added to the solution. The temperature is raised in the course of 1 hour to 150–155° C. and the mixture is stirred for 3 hours at this temperature. The yellow-brown suspension of the dyestuff of the formula

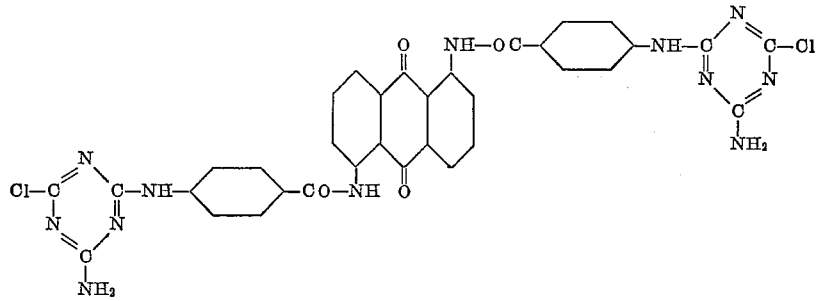

is isolated by filtration, washed with nitrobenzene and then with alcohol, and dried in vacuo at 70° C.

The dyestuff dyes cotton and regenerated cellulose by the method described in Example 19 orange tints having good fastness properties. The dyeing is fast even to hot organic solvents.

When in this example 2-(4'-carboxyphenylamino)-4'-amino-6-chloro-1:3:5-triazine is replaced by an equimolecular amount of 2-(4'-carboxyphenylamino)-4-dimethylamino-6-chloro-1:3:5-triazine, or of 2-(4'-carboxyphenylamino)-4-diethylamino-6-chloro-1:3:5-triazine, or of 2-(3'-carboxyphenylamino)-4-amino-6-chloro-1:3:5-triazine, dyestuffs are obtained that have similar properties.

*Example 8*

5.1 parts of the condensaton product from 4-aminobenzoic acid, cyanuric chloride and sulfanilic acid of the formula

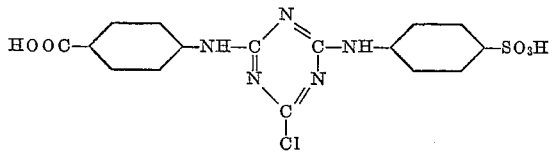

are converted for use as an acylating component into the corresponding carboxylic acid-sulfonic acid dichloride with 5.0 parts of thionyl chloride and 1.0 part of dimethyl formamide by being heated for 2 hours at 90–100° C. in 100 parts of nitrobenzene. 3.0 parts of 1-amino-5-benzoylamino-anthraquinone are then added, and the whole is heated for 3 hours at 130 to 135° C. After cooling to room temperature, the orange-colored dyestuff suspension is filtered off, washed with alcohol, and dried in vacuo at 70–80° C.

The dyestuff of the probable formula

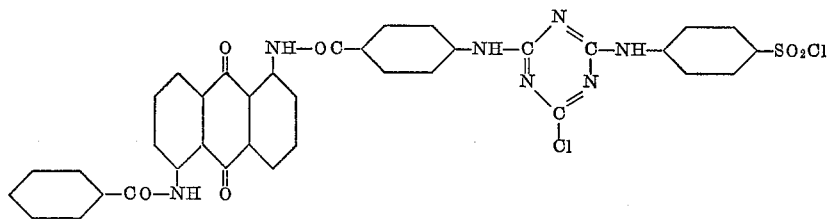

dyes cotton and regenerated cellulose yellow tints of very good fastness to washing.

The acylating component used in this example can be prepared in an aqueous medium by condensing the sodium salt of 4-aminobenzoic acid with cyanuric chloride at 0 to 5° C. in the molecular ratio of 1:1 and by further adding one molecular proportion of the sodium salt of sulfanilic acid; this second condensation is performed at 30–40° C. by adding sodium hydroxide solution dropwise at pH=6.0 to 7.5 until a solution is obtained and sulfanilic acid can no longer be detected. The condensation product can be precipitated from its solution in the form of the crystalline disodium salt by the addition of sodium chloride and then isolated by filtration.

*Example 9*

10.7 parts of 2:4-bis-(4'carboxyphenyl)-6-hydroxy-1:3:5-triazine are slowly heated with stirring to 110° C. in 100 parts of nitrobenzene with the addition of 24 parts of thionyl chloride and 2 parts of dimethyl formamide. The resulting clear solution is maintained for 45 minutes at 110° C. and then cooled, whereupon the product crystallizes out in the form of long, fine needles. It is filtered off, washed with dry petroleum ether and dried in vacuo at room temperature. The product of the formula

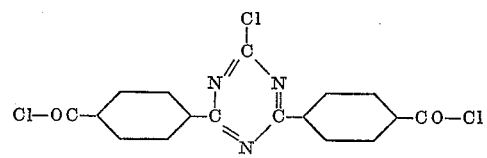

crystallizes from acetone in long, fine needles melting at 212° C. (uncorrected).

4 parts of this acid chloride are made up at 60° C. into a clear solution in 150 parts of nitrobenzene. 6.9 parts of 1-amino-5-benzoylamino-anthraquinone are then added, the whole is slowly heated to 120° C. and maintained at this temperature for 5 hours. The dyestuff of the formula

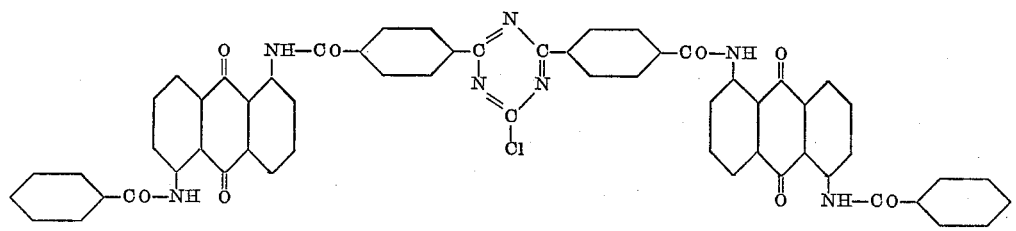

is isolated in the usual manner; it dyes cotton and regenerated cellulose clear yellow tints of good fastness properties. The corresponding dyestuff from 1-aminoanthraquinone yields a greenish yellow dyeing, and the corresponding dyestuff from 1-amino-4-benzoylamino-anthraquinone produces red tints.

The analogous dyestuff of the formula

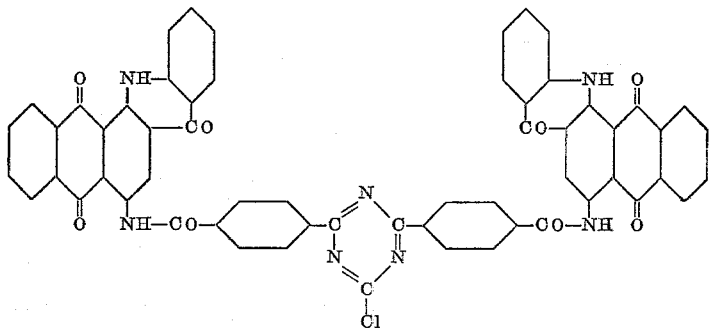

dyes cotton and regenerated cellulose from an alkaline hydrosulfite vat greenish blue tints of good fastness properties.

2:4-bis-(4'-carboxyphenyl)-6-hydroxy - 1:3:5 - triazine can be prepared from 2:4-bis-(4'-tolyl)-6-hydroxy-1:3:5-triazine by oxidation with potassium permanganate in an alkaline aqueous solution.

*Example 10*

9.4 parts of 2-(4'-carboxyphenylamino)-4:6-dichloro-1:3:5-triazine are heated in 350 parts of nitrobenzene with 12 parts of thionyl chloride and 1.5 parts of dimethyl formamide for 2 hours at 110° C. The excess thionyl chloride is distilled off in vacuo, 10.2 parts of 4-amino-anthraquinone-2:1(N)-acridone are added at 50° C., and the whole is heated for 16 hours at 80° C. and for 6 hours at 100° C. The resulting dyestuff of the formula

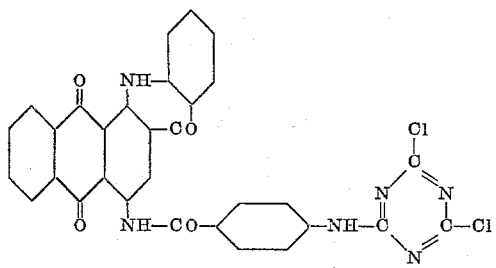

is isolated in the usual manner; it dyes cotton and regenerated cellulose greenish blue tints having good properties of fastness.

*Example 11*

8.8 parts of 2-(4'-carboxyphenylamino) - 4 - amino - 6-chloro-1:3:5-triazine are slowly heated in 350 parts of nitrobenzene with 12 parts of thionyl chloride and 1.5 parts of dimethyl formamide with stirring to 120° C., whereupon the compound dissolves with evolution of hydrochloric acid. After 15 minutes the excess thionyl chloride is distilled off in vacuo at 70° C., 10.2 parts of 4-aminoanthraquinone-2:1(N)-acridone are added, and the mixture is heated for 2 hours at 100° C. and for 1 hour at 120° C. After cooling, the blue dyestuff of the formula

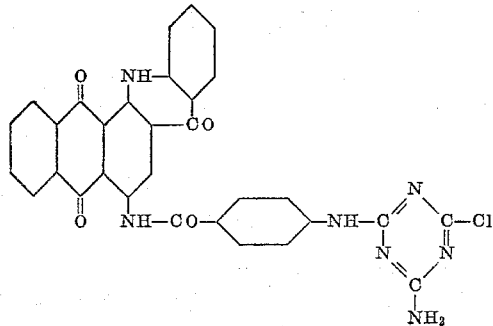

is filtered off, washed with alcohol, and dried in vacuo at 90 to 100° C.

The dyestuff dyes cotton and regenerated cellulose by the method described in Example 19 greenish blue tints having good fastness properties.

*Example 12*

4.2 parts of aminoacedinanthrone are acylated with 3.2 parts of the carboxylic acid chloride of 2-(4'-carboxyphenylamino)-4-amino-6-chloro - 1:3:5 - triazine in 100 parts of nitrobenzene and 0.2 part of pyridine by being stirred for 6 hours at 140 to 150° C. After cooling to room temperature, the dyestuff of the formula

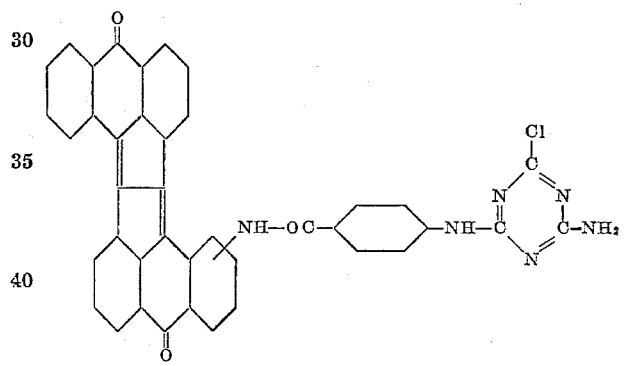

is filtered off, washed with nitrobenzene and then with alcohol, and dried in vacuo at 70° C.

The dyestuff dyes cotton and regenerated cellulose fast brown tints.

Similar good results are obtained when in this example 2-(4'-carboxyphenylamino)-4-amino-6-chloro - 1:3:5 - triazine is replaced by an equimolecular amount of 2-(4'-carboxyphenylamino)-4-phenyl-6-chloro-1:3:5-triazine of the formula

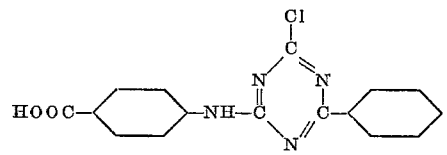

or of 2-(4'-carboxyphenylamino)-4-phenoxy-6-chloro-1:3:5-triazine of the formula

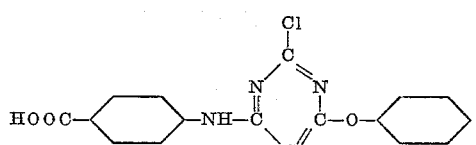

The acylating components can be prepared in crystalline form by condensing in an aqueous medium equimolecular amounts of the sodium salt of 4-aminobenzoic acid and a finely dispersed suspension of 2-phenyl-4:6-dichlorotriazine, or 2-phenoxy-4:6-dichlorotriazine respectively, at 40° C.

Example 13

3.2 parts of 2-(3'-carboxyphenylamino) - 4 - amino-6-chloro-1:3:5-triazine are suspended in 100 parts of dry nitrobenzene and 2.0 parts of thionyl chloride are stirred in. The whole is heated to 90–100° C., and in the course of 2 hours a clear solution of the corresponding carboxylic acid chloride is formed. 3.45 parts of 1-amino-5-benzoylamino-anthraquinone are then added and the temperature is raised to 135 to 140° C., the mixture is stirred on for 6 hours at this temperature and then cooled to room temperature. The dyestuff of the formula

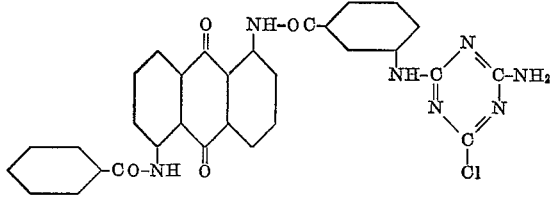

is filtered off, washed with alcohol, and dried in vacuo at 70° C.

The dyestuff dyes cotton and regenerated cellulose very fast orange-yellow tints.

The 2-(3'-carboxyphenylamino)-4-amino - 6 - chloro-1:3:5-triazine used in this example can be prepared by condensing in an aqueous medium a fine suspension of 2-amino-4:6-dichloro-1:3:5-triazine and the sodium salt of 3-aminobenzoic acid in the molecular ratio of 1:1 at 30 to 40° C.

Example 14

6.1 parts of the carboxylic acid chloride of 2-(4'-carboxyphenylamino)-4:6-dichloro - 1:3:5 - triazine are dissolved at 100° C. in 200 parts of nitrobenzene, 9.6 parts of 1-aminoanthraquinone are added, the mixture is raised in the course of 45 minutes to 160° C. and stirred at this temperature for 5 hours.

The dyestuff of the formula

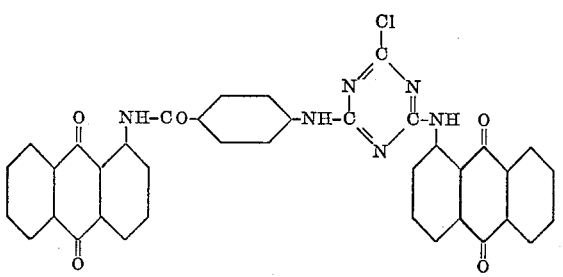

dyes cotton and regenerated cellulose by the method described in Example 20 yellow tints of very good fastness properties.

The dyestuff of the formula

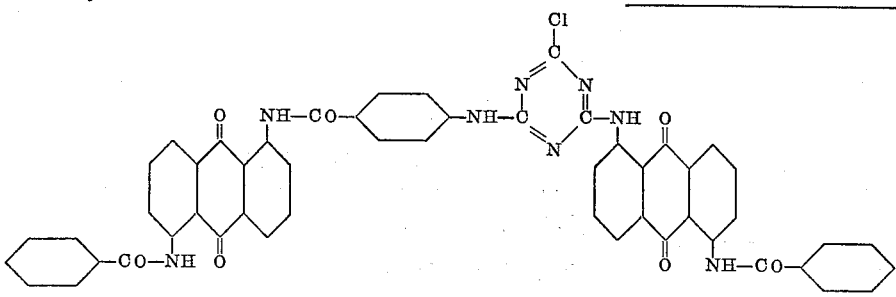

is prepared in an analogous manner and gives golden-yellow dyeings from an alkaline hydrosulfite vat.

Example 15

7 parts of 2-(4'-carboxyphenyl)-4:6-dihydroxy-1:3:5-triazine are heated in 250 parts of nitrobenzene, while being stirred, with 24 parts of thionyl chloride and 3 parts of dimethyl formamide to 105° C. and maintained at this temperature for 2 hours. The excess thionyl chloride is then distilled off in vacuo. At 80° C., 13.7 parts of 1-aminoanthraquinone are added, and the whole is raised to 100° C. within 30 minutes, and then heated for 4 hours at 100° C., for 2 hours at 120° C. and for 3 hours at 140° C. The dyestuff of the formula

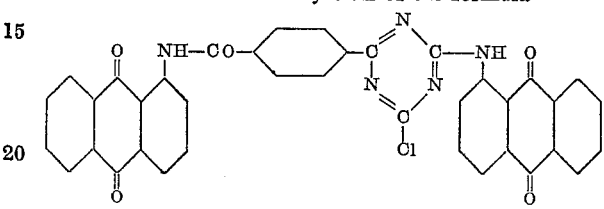

is isolated in the usual manner; it dyes cotton and regenerated cellulose by the method described in Example 19 or 20 clear yellow tints having good fastness properties.

The dyestuff of the formula

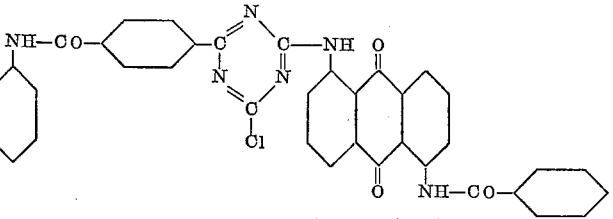

is prepared in an analogous manner; it dyes cotton and regenerated cellulose from an alkaline hydrosulfite vat gold-orange tints of good fastness properties.

Equally fast, red dyeings are obtained with the analogous dyestuff from 1-amino-4-benzoylamino - anthraquinone, while the dyestuff from 4-aminoanthraquinone-2:1(N)-acridone yields greenish blue tints.

2-(4'-carboxyphenyl)-4:6-dihydroxy-1:3:5-triazine can be prepared from 2-(4'-tolyl)-4:6-dihydroxy-1:3:5-triazine by oxidation with potassium permanganate in an alkaline aqueous solution.

Example 16

6.5 parts of 2-(4'-carboxyphenylamino)-4-phenyl-6-chloro-1:3:5-triazine in 120 parts of nitrobenzene are heated in the presence of 4.8 parts of thionyl chloride for 1 hour at 110° C. The excess thionyl chloride is removed from the resulting clear solution by distillation under reduced pressure. At 80° C., 4.6 parts of 1-aminoanthraquinone are added and the whole is maintained for 24 hours at 80° C. The dyestuff of the formula

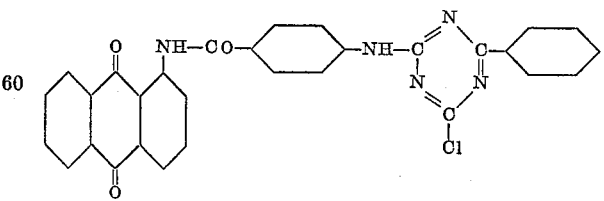

is isolated in the usual manner; it dyes cotton and regenerated cellulose by the method described in Example 19 clear yellow tints of good fastness properties.

The dyestuff of the formula

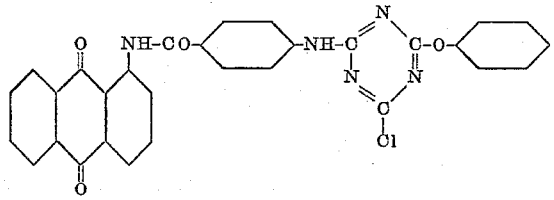

is obtained by using in the above example 7.6 parts of 2 - (4' - carboxyphenylamino) - 4 - phenoxy - 6 - chloro-1:3:5-triazine; it gives similar, slightly more greenish tints.

Example 17

3.2 parts of 2-(4'-carboxyphenylamino)-4-amino-6-chloro-1:3:5-triazine are converted into the corresponding carboxylic acid chloride in 100 parts of nitrobenzene with 4 parts of thionyl chloride with addition of 0.5 part of dimethyl formamide at 100 to 110° C. The excess thionyl chloride is distilled off the solution in vacuo, and 4.7 parts of aminodibenzanthrone are added. 0.5 part of pyridine is then added and the whole is heated with stirring for 6 hours at 140 to 150° C., and then for 3 hours at 160 to 170° C. After cooling, the dyestuff of the formula

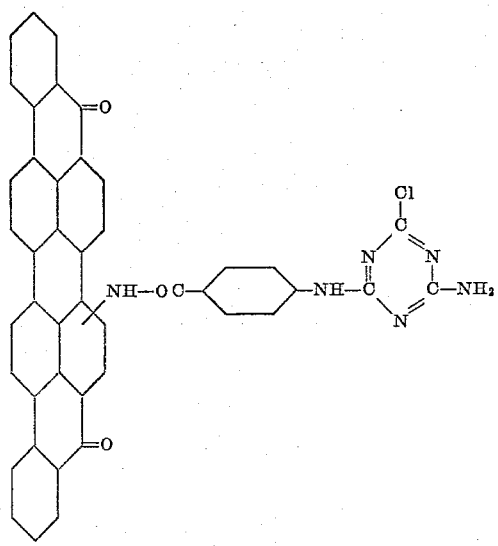

is filtered off, washed with nitrobenzene and then with alcohol, and dried in vacuo at 70° C.

The dyestuff dyes cotton and regenerated cellulose very fast blackish green tints.

When in this example aminoisodibenzanthrone is used instead of aminodibenzanthrone, a dyestuff results which dyes cotton violet tints of similar properties.

Example 18

2.3 parts of 4:5'-diamino-1:1'-dianthramide carbazole are acylated with 3.2 parts of the carboxylic acid chloride of 2-(4' - carboxyphenylamino) - 4 - amino - 6 - chloro-1:3:5-triazine as described in Example 7 and then isolated.

The dyestuff of the formula

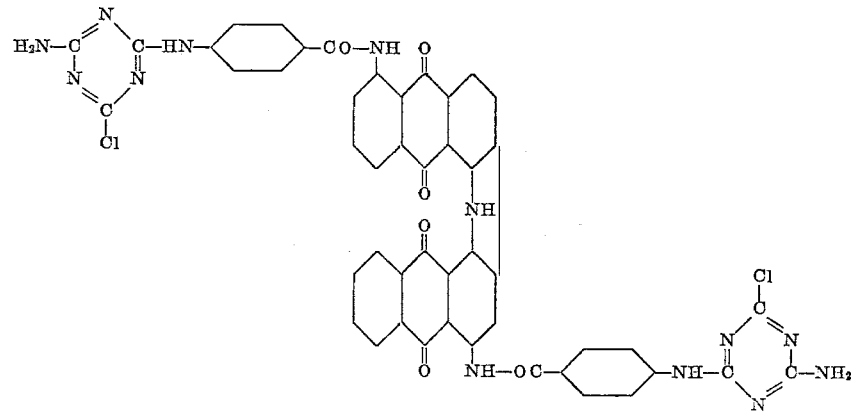

dyes cotton and regenerated cellulose brown tints having very good properties of fastness.

When 2-(4'-carboxyphenylamino) - 4 - amino-6-chloro-1:3:5-triazine is replaced by an equimolecular amount of 2 - (4' - carboxyphenylamino-4-phenylamino - 6 - chloro-1:3:5-triazine of the formula

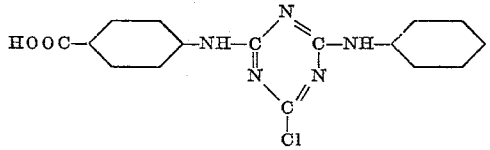

or of 2-(4'-carboxyphenylamino)-4-cyclohexylamino-6-chloro-1:3:5-triazine of the formula

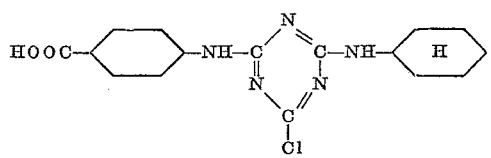

dyestuffs of similar properties are obtained.

These acylating components can be prepared in an aqueous medium by condensing the sodium salt of 4-aminobenzoic acid with cyanuric chloride in the molecular ratio of 1:1 at 0 to 5° C. and adding one molecular proportion of aniline hydrochloride or of cyclohexylamine hydrochloride respectively; the second condensation is carried out at 30–40° C. and a pH value of 6.5 to 7.5 by the dropwise addition of sodium hydroxide solution until a primary amino group can no longer be detected. The free carboxylic acid is then precipitated quantitatively with dilute hydrochloric acid and filtered off.

Example 19

14 parts of the dyestuff obtained as described in Example 1 are finely ground in a ball mill with 126 parts of a neutral solution of 125 parts of dinaphthyl-methane-disulfonic acid in 1000 parts of water.

7.5 parts of the resulting paste are suspended in 250 parts of warm water. The dyestuff suspension thus obtained is added to a solution heated at 50° C. of 10 parts by volume of sodium hydroxide solution of 30% strength and 6 parts of sodium hydrosulfite in 1750 parts of water and vatted for 1 minute. 50 parts of cotton are dyed for 45 minutes in the dyebath prepared in this manner at 50 to 60° C. with addition of 60 parts of sodium chloride. After the dyeing the cotton is washed, oxidized, acidified, again thoroughly rinsed and soaped at the boil. An orange-yellow dyeing is obtained which has very good fastness properties.

*Example 20*

14 parts of the dyestuff obtained as described in Example 2 are finely ground in a ball mill with 126 parts of a neutral solution of 125 parts of dinaphthyl-methanedisulfonic acid in 1000 parts of water. 10 parts of the resulting paste are suspended in 100 parts of water. A cotton fabric is impregnated with this suspension to a weight increase of 75% and then dried. The fabric is then impregnated with a solution containing per liter 16 grams of sodium hydroxide, 10 to 300 grams of sodium chloride and 30 grams of Rongalite (trade name for sodium sulfoxylate formaldehyde), squeezed to a weight increase of 75%, the dyeing is steamed for 1 to 9 minutes at 100 to 101° C., thoroughly rinsed in cold water, treated with a sodium bicarbonate solution of 0.5% strength, rinsed, soaped for 20 minutes in a boiling 0.3% solution of a non-ionic detergent, rinsed and dried. A clear yellow dyeing of good fastness properties is obtained.

*Example 21*

28 parts of the dyestuff obtained as described in Example 5 are ground in a ball mill with 112 parts of a neutral solution of 125 parts of dinaphthyl-methanedisulfonic acid in 1000 parts of water.

A printing paste is prepared from

<u>100 parts of the dyestuff paste described above
300 parts of water
600 parts of thickening KD</u>
1000 parts

PREPARATION OF THICKENING KD (a) 20 parts of locust bean flour are strewn into 450 parts of water.

(b) 15 parts of wheat starch are pasted in 20 parts of water and diluted with 495 parts of boiling water.

(a) and (b) are combined, boiled for 20 minutes and stirred until cold. 1 part by volume of aqueous formaldehyde solution of 30% strength is added as preservative.

The printing paste is printed on a fabric of cotton or staple fibers of regenerated cellulose on a roller printing machine. The fabric is dried, impregnated with a solution containing per liter 24 grams of sodium hydroxide, 70 grams of sodium hydrosulfite, 50 grams of sodium sulfate and 20 grams of borax, squeezed to a weight increase of 70% and fixed for 24 seconds at 120° C. in a Monforts reactor, thoroughly rinsed in cold water, oxidized at 40° C., in a solution containing per liter 5 parts by volume of hydrogen peroxide of 30% strength and 3 parts by volume of acetic acid of 40% strength, rinsed, soaped at the boil for 15 minutes, rinsed and dried.

A clear, yellow-orange print of excellent fastness properties results.

What is claimed is:

1. An anthraquinone vat dyestuff of the formula

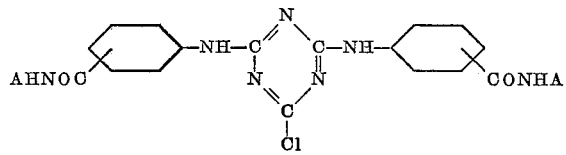

in which A represents anthraquinonyl.

2. The dyestuff of the formula

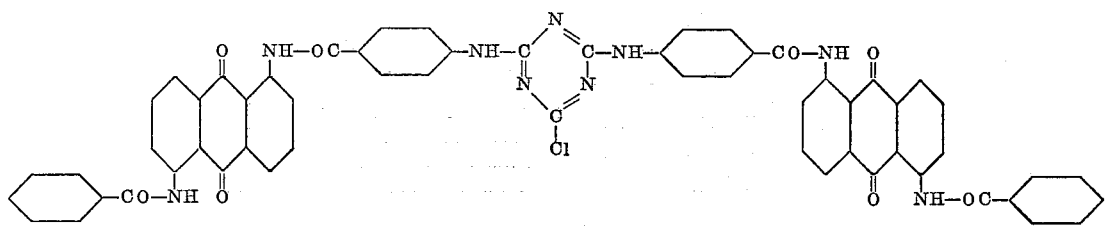

3. The dyestuff of the formula

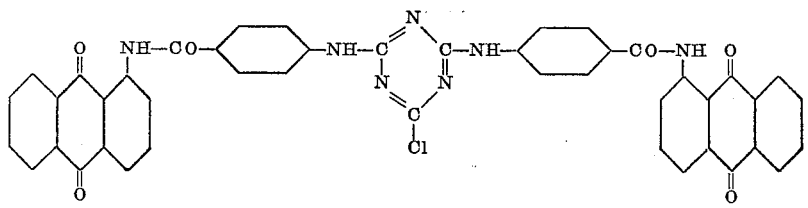

4. The dyestuff of the formula

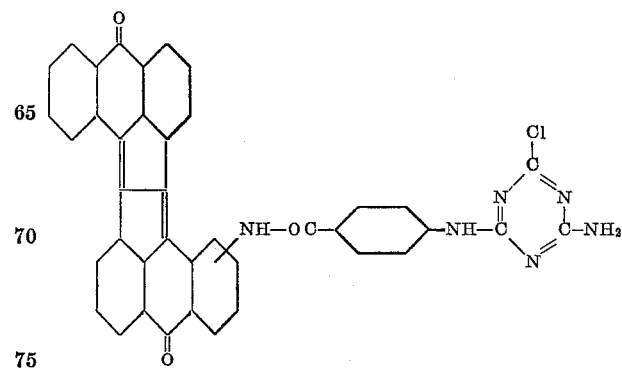

5. The dyestuff of the formula
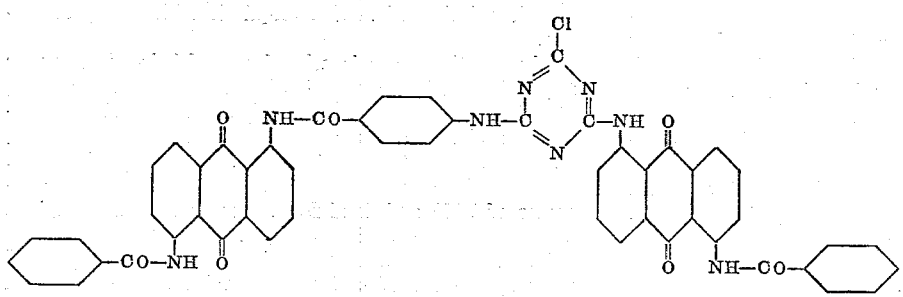
6. The dyestuff of the formula
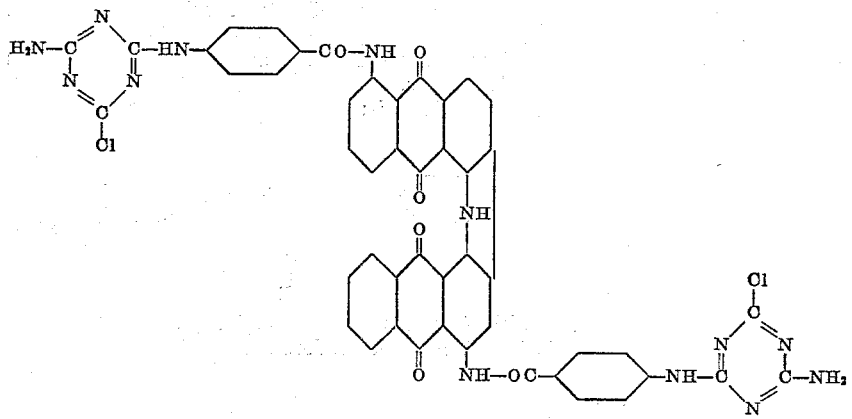
References Cited in the file of this patent
UNITED STATES PATENTS
| | | |
|---|---|---|
| 2,235,480 | Graenacher et al. | Mar. 18, 1941 |
| 2,391,164 | Kaiser | Dec. 18, 1945 |
| 2,824,093 | Benz et al. | Feb. 18, 1958 |
| 2,835,663 | Benz | May 20, 1958 |
OTHER REFERENCES
Bergmann: The Chemistry of Acetylene and Related Compounds, page 80, Interscience Publishers Inc., New York (1948).
Hess et al.: Nature, vol. 183, pages 260 to 261 (Jan. 24, 1959).